United States Patent
Ci et al.

(10) Patent No.: US 12,322,750 B2
(45) Date of Patent: Jun. 3, 2025

(54) AL-DOPED SHEET LLZO COMPOSITE SOLID-STATE ELECTROLYTE AND PREPARATION METHOD AND APPLICATION THEREOF

(71) Applicant: SHENZHEN SOLID ADVANCED MATERIALS TECHNOLOGY CO., LTD., Shenzhen (CN)

(72) Inventors: Lijie Ci, Shenzhen (CN); Jun Cheng, Shenzhen (CN)

(73) Assignee: SHENZHEN SOLID ADVANCED MATERIALS TECHNOLOGY CO., LTD., Shenzhen (CN)

( * ) Notice: Subject to any disclaimer, the term of this patent is extended or adjusted under 35 U.S.C. 154(b) by 721 days.

(21) Appl. No.: 17/604,736

(22) PCT Filed: Nov. 19, 2019

(86) PCT No.: PCT/CN2019/119516
§ 371 (c)(1),
(2) Date: Oct. 18, 2021

(87) PCT Pub. No.: WO2020/211375
PCT Pub. Date: Oct. 22, 2020

(65) Prior Publication Data
US 2022/0263121 A1    Aug. 18, 2022

(30) Foreign Application Priority Data
Apr. 16, 2019 (CN) .......................... 201910304485.6

(51) Int. Cl.
*H01M 10/0562* (2010.01)
*H01M 10/0565* (2010.01)

(52) U.S. Cl.
CPC ... *H01M 10/0562* (2013.01); *H01M 10/0565* (2013.01); *H01M 2300/0071* (2013.01);
(Continued)

(58) Field of Classification Search
CPC ......... H01M 10/0562; H01M 10/0565; H01M 2300/0071; H01M 2300/0082; H01M 2300/0085
See application file for complete search history.

(56) References Cited

FOREIGN PATENT DOCUMENTS

| CN | 104628381 A | 5/2015 |
|----|-------------|--------|
| CN | 106058166 A | 10/2016 |

(Continued)

OTHER PUBLICATIONS

Im et al. "Al-incorporation into Li7La3Zr2O12 solid electrolyte keeping stabilized cubic phase for all-solid-state Li batteries." Jounrla of Energy Chemistry 21 (2018) 1501-1508 (Year: 2018).*

(Continued)

*Primary Examiner* — Matthew W Van Oudenaren
*Assistant Examiner* — Katherine N Higgins
(74) *Attorney, Agent, or Firm* — Oliff PLC

(57) ABSTRACT

A preparation of solid-state electrolytes, in particular to an Al-doped sheet LLZO composite solid-state electrolyte and a preparation method and application thereof. The composite solid-state electrolyte includes Al ions, an LLZO solid-state electrolyte and a polymer substrate. The Al is doped in the LLZO solid-state electrolyte in a sheet structure, and the LLZO solid-state electrolyte is dispersed in the polymer substrate. The composite solid-state electrolyte has good flexibility, and has higher ionic conductivity than the granular doped composite solid-state electrolyte since the sheet LLZO provides a fast conduction channel for lithium ions. In addition, the preparation method is simple, suitable for large-scale production, and environmentally friendly since no toxic solvent is used in the preparation process.

6 Claims, 4 Drawing Sheets

(52) U.S. Cl.
CPC ............... *H01M 2300/0082* (2013.01); *H01M 2300/0085* (2013.01)

(56) References Cited

FOREIGN PATENT DOCUMENTS

| | | |
|---|---|---|
| CN | 106654362 A | 5/2017 |
| CN | 107039634 A | 8/2017 |
| CN | 107384255 A | 11/2017 |
| CN | 107681195 A | 2/2018 |
| CN | 106450424 B | 8/2018 |
| CN | 108417889 A | 8/2018 |
| CN | 109052473 A | 12/2018 |
| CN | 109167094 A | 1/2019 |
| CN | 109980272 A | 7/2019 |
| JP | 2018-8843 A | 1/2018 |
| WO | 2018/056082 A1 | 3/2018 |

OTHER PUBLICATIONS

Jin et al. "Al-doped Li7La3Zr2O12 synthesized by a polymerized complex method." Journal of Power Sources 196 (2011) 8683:8687 (Year: 2011).*

Song et al. "Composite Solid Polymer Electrolyte with Garnet Nanosheets in Poly(ethylene oxide)." ACS Sustainable Chemistry & Engineering 2019 7 (7), 7163-7170 (Year: 2019).*

Sun et al. "Improving Ionic Conductivity with Bimodal-Sized Li7La3Zr2O12 Fillers for Composite Polymer Electrolyte. " ACS Applied Materials & Interfaces 2019 11 (13), 12467-12475 (Year: 2019).*

Tsai et al. "High Conductivity of Mixed Phase Al-substituted Li7La3Zr2O12." J Electroceram 35 (2015) 25-35 (Year: 2015).*

Zheng et al. "Lithium Ion Pathway within Li7La3Zr2O12-Polyethylene Oxide Composite Electrolytes."Angew. Chem. Int. Ed. 2016, 55, 12538. (Year: 2016).*

Feb. 27, 2020 International Search Report issued in International Patent Application No. PCT/CN2019/119516.

Feb. 27, 2020 Written Opinion issued in International Patent Application No. PCT/CN2019/119516.

May 7, 2020 Office Action issued in Chinese Patent Application No. 201910304485.6.

Cao, Xueyan. "Synthesis and Ionic Conducting Properties of doped Li7 La3 Zr2 O12 Solid-state Electrolyte" Chinese Master's Theses Full-text Database, Engineering Science & Technology II, No. 4, Apr. 15, 2015.

Zhao et al. "A promising PEO/LAGP hybrid electrolyte prepared by a simple method for all-solid-state lithium batteries." Solid State Ionics. vol. 295. 2016. pp. 65-71.

Chen et al. "PEO/Garnet Composite Electrolytes for Solid-State Lithium Batteries: from "Ceramic-in Polymer" to "Polymer-in-Ceramic"." Nano Energy. 2017.

* cited by examiner

AL-DOPED SHEET LLZO COMPOSITE SOLID-STATE ELECTROLYTE AND PREPARATION METHOD AND APPLICATION THEREOF

TECHNICAL FIELD

The disclosure relates to the technical field of preparation of solid-state electrolytes, in particular to an Al-doped sheet LLZO composite solid-state electrolyte and a preparation method and application thereof.

BACKGROUND

In the Background of the disclosure, the disclosed information is only intended to enhance the understanding of the overall background of the disclosure, and is not necessarily regarded as an acknowledgement or any form of suggestion that the information constitutes the prior art known to those of ordinary skill in the art.

Due to the high energy density, lithium metal batteries are considered to be one of the most promising next-generation secondary batteries. However, traditional lithium metal batteries using organic liquid electrolytes have many problems, such as electrolyte leakage, and fires and even explosions caused by the growth of lithium dendrites. Using solid-state electrolytes instead of traditional organic liquid electrolytes can effectively prevent these safety problems. Solid-state electrolytes include inorganic solid-state electrolytes and polymer solid-state electrolytes. The inorganic solid-state electrolytes include LAGP, LATP, LLZO, LPS and LiPON, and polymer solid-state electrolytes include PEO, PVDF, PPC and PVP. Various electrolytes have their own advantages and disadvantages. Polymer-based composite solid-state electrolytes are of most concern. Among the polymer-based composite solid-state electrolytes, PEO-based solid-state electrolytes are one of the most studied composite solid-state electrolytes. Among the PEO-based composites, inorganic powder is incorporated into the main PEO polymer matrix to influence recrystallization kinetics of the PEO polymer chain to promote the local amorphous region, thus increasing the ionic conductivity of the lithium salt-polymer system. The addition of the powder can also improve electrochemical stability and enhance mechanical strength.

Zhao et al. prepared an LAGP-doped PEO composite solid-state electrolyte and studied the performance of the PEO composite solid-state electrolyte doped with different contents of LAGP (referring to: A promising PEO/LAGP hybrid electrolyte prepared by a simple method for all-solid-state lithium batteries. Solid State Ionics 2016, 295, 65-71). Studies have shown that this method can effectively combine inorganic fillers and PEO polymer electrolytes to form composite solid-state electrolytes. However, the inventors believe that in the solid-state electrolyte prepared by this method, LAGP distributed in the form of granules in the PEO cannot provide a continuous lithium ion conduction channel.

Chen et al. prepared LLZTO-doped PEO composite solid-state electrolytes (referring to: PEO/garnet composite electrolytes for solid-state lithium batteries: From "ceramic-in-polymer" to "polymer-in-ceramic". Nano Energy 2018, 46, 176-184). LLZTO and PEO were mixed, ground and subjected to vacuum heating for 12 h. Then, the mixture was heated and pressed into sheets to obtain the solid-state electrolyte. The obtained solid-state electrolyte was greatly improved as compared with pure PEO. However, the inventors believe that the LLZTO in the solid-state electrolyte also exists in the form of granules and cannot provide a continuous lithium ion conduction channel.

Chinese Patent Document No. 201610511980.0 discloses a polymer composite solid-state electrolyte and a preparation method and application thereof. Polyethylene oxide, an inorganic solid-state electrolyte and lithium bis(trifluoromethanesulfonyl)imide were respectively dried at 50° C. and 120° C., then the polyethylene oxide and the lithium bis(trifluoromethanesulfonyl)imide were respectively dissolved in acetonitrile, and the inorganic solid-state electrolyte was dispersed in the above solution to obtain a uniformly mixed solution. The obtained mixed solution was poured into a polytetrafluoroethylene mold, the acetonitrile solvent was volatilized in a vacuum, and the product was subjected to vacuum drying at 50° C. to obtain the solid-state electrolyte. However, the inventors believe that the granular LLZO doped PEO-based composite solid-state electrolyte obtained by this method has insufficient effects in inhibiting lithium dendrites and cannot provide a continuous network for lithium ion conduction.

SUMMARY

In view of the fact that the above composite solid-state electrolyte still has insufficient effects in inhibiting lithium dendrites and increasing its conductivity, the disclosure is directed to an Al-doped sheet LLZO solid-state electrolyte and a preparation method and application thereof. The composite solid-state electrolyte prepared in the disclosure has good flexibility, and has higher ionic conductivity than the granular doped composite solid-state electrolyte since the sheet LLZO provides a fast conduction channel for lithium ions.

A first objective of the disclosure is to provide an Al-doped sheet LLZO composite solid-state electrolyte.

A second objective of the disclosure is to provide a preparation method of the Al-doped sheet LLZO composite solid-state electrolyte.

A third objective of the disclosure is to provide an all-solid-state battery including the Al-doped sheet LLZO composite solid-state electrolyte.

A fourth objective of the disclosure is to provide application of the Al-doped sheet LLZO composite solid-state electrolyte and the preparation method thereof and the all-solid-state battery.

In order to achieve the above objectives of the disclosure, the disclosure provides the following technical solutions:

Firstly, the disclosure provides an Al-doped sheet LLZO composite solid-state electrolyte, including an Al-doped LLZO solid-state electrolyte and a polymer substrate. The Al element is doped in the LLZO solid-state electrolyte in a sheet structure, and the LLZO solid-state electrolyte is dispersed in the polymer substrate.

As a further technical solution, the polymer substrate includes: any one of polyvinylidene fluoride (PVDF), PEO and the like.

As a further technical solution, a stoichiometric ratio of the Al is 0.2-0.35.

As a further technical solution, in the Al-doped sheet LLZO composite solid-state electrolyte, a content of the LLZO solid-state electrolyte accounts for 10-50% of total mass of the composite solid-state electrolyte.

Secondly, the disclosure provides a preparation method of the Al-doped sheet LLZO composite solid-state electrolyte, including the following steps:

(1) adding metal cations $Li^+$, $La^{3+}$, $Zr^{4+}$ and $Al^{3+}$ to a mixed solution of ethanol and deionized water to obtain a mixed solution A;
(2) adding citric acid to the mixed solution A in step (1), uniformly stirring the mixture, then adding ethylene glycol, uniformly stirring the mixture, adding graphene oxide, and stirring the mixture to obtain a mixed solution B;
(3) placing the mixed solution B in step (2) on a heating stirrer, and heating and stirring the mixed solution B until the liquid is completely evaporated, thereby obtaining sheet LLZO precursor powder;
(4) calcining the sheet LLZO precursor powder in step (3) to obtain Al-doped sheet LLZO for later use;
(5) dissolving a polymer electrolyte and a lithium salt in an organic solvent in a protective atmosphere, and then adding the Al-doped sheet LLZO in step (4) to obtain a mixed solution C; and
(6) after the solvent in the mixed solution C in step (5) is volatilized, oven-drying the obtained product, and then air-drying the product in a protective atmosphere to obtain the Al-doped sheet LLZO composite solid-state electrolyte.

As a further technical solution, in step (1), the $Li^+$, $La^{3+}$, $Zr^{4+}$ and $Al^{3+}$ are respectively water-soluble inorganic salts of the corresponding ions, for example, lithium nitrate, lanthanum nitrate, zirconyl nitrate and aluminum nitrate. The aluminum nitrate may be replaced with zirconium acetylacetonate.

As a further technical solution, a ratio of the lithium nitrate to the lanthanum nitrate to the zirconyl nitrate to the aluminum nitrate is: 4.5-6 g:11-13.5 g:4.5-6 g:1-1.8 g, the water is added such that the above nitrates can be sufficiently dissolved, and the ethanol and the water may be added in equal volumes.

As a further technical solution, in step (2), a molar ratio of the citric acid to the total metal cations is (1-3):1, preferably 2:1. The citric acid is used as a complexing agent to complex the metal ions for preparing the LLZO raw material.

As a further technical solution, in step (2), a molar ratio of the ethylene glycol to the citric acid is 1:1-2), more preferably 1:1. The ethylene glycol may undergo an esterification reaction with the citric acid to further increase the dispersibility of the metal ions.

As a further technical solution, in step (2), a stirring time after adding the graphene oxide is 8-14 h. The graphene oxide has lots of carboxyl and hydroxyl groups that can attract positively charged metal ions, so that the LLZO can be formed on the surface of graphene oxide and distributed uniformly.

As a further technical solution, in step (4), the calcination is carried out by keeping the temperature at 700-800° C. for 2-8 h. At this temperature, cubic phase LLZO can be obtained.

As a further technical solution, in step (5), the polymer electrolyte includes: any one of polyvinylidene fluoride (PVDF), PEO and the like. The polymer electrolyte has functions of serving as a carrier for carrying Al-doped sheet LLZO and conducting lithium ions.

As a further technical solution, in step (5), the lithium salt includes: LiTFSI or $LiClO_4$. As a further technical solution, in step (5), a molar ratio of the polymer electrolyte to lithium in the lithium salt is 6-10:1.

As a further technical solution, in step (5), the organic solvent includes any one of tetrahydrofuran, acetonitrile, N,N-dimethylformamide (DMF) and the like.

As a further technical solution, in step (6), the oven-drying is carried out at a temperature of 50-70° C. for 10-12 h. The main purpose of the drying is to remove the residual solvent, thereby preventing the residual solvents from affecting the conductivity of the electrolyte.

As a further technical solution, the protective atmosphere includes argon. The main function of the protective atmosphere is to prevent the lithium salt from absorbing water and prevent the lithium sheet from contacting and reacting with air.

Thirdly, the disclosure provides an all-solid-state battery, including an anode, an electrolyte membrane, a cathode, a gasket, a spring and a battery case. The gasket, the anode, the electrolyte membrane, the cathode, the gasket and the spring are sequentially laminated, the above laminated structure is encapsulated inside the battery case, and the electrolyte membrane is the Al-doped sheet LLZO composite solid-state electrolyte provided by the disclosure.

Finally, the disclosure provides application of the Al-doped sheet LLZO composite solid-state electrolyte and the preparation method thereof and the all-solid-state battery in energy storage materials, automobiles and the like.

Compared with the prior art, the disclosure has the following beneficial effects: the Al-doped sheet LLZO solid-state electrolyte prepared in the disclosure has high conductivity and has good effects in inhibiting lithium dendrites for the following reasons. The prepared composite solid-state electrolyte has good flexibility. The Al-doped LLZO can stabilize the cubic phase, the cubic phase LLZO can provide lots of fast conduction channels for lithium ions, so that the prepared composite solid-state electrolyte has higher ionic conductivity than the granular doped composite solid-state electrolyte. On the one hand, the sheet LLZO doped into the polymer electrolyte can enhance mechanical properties of the electrolyte, which can inhibit the growth of the lithium dendrites. On the other hand, the sheet LLZO can provide a continuous ceramic plane, which can also inhibit the growth of the lithium dendrites.

BRIEF DESCRIPTION OF THE DRAWINGS

The accompanying drawings constituting a part of the disclosure are used to provide a further understanding of the disclosure. The exemplary examples of the disclosure and descriptions thereof are used to explain the disclosure, and do not constitute an improper limitation to the disclosure.

DETAILED DESCRIPTION

Figure 1:
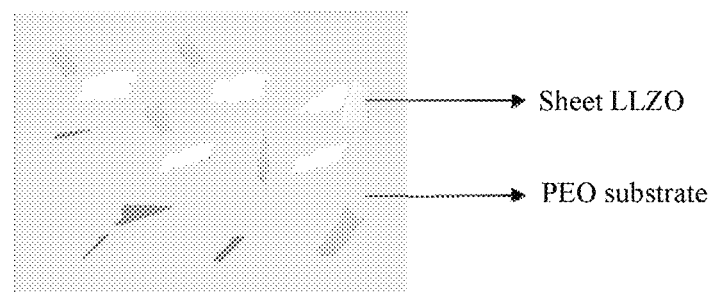
FIG. 1 is a schematic structural diagram of an Al-doped sheet LLZO composite solid-state electrolyte prepared in Example 1 of the disclosure.

It should be noted that the following detailed descriptions are all illustrative and are intended to provide further descriptions of the disclosure. Unless otherwise specified, all technical and scientific terms used herein have the same meanings as those usually understood by a person of ordinary skill in the art to which the disclosure belongs.

It should be noted that the terms used herein are merely used for describing specific implementations, and are not intended to limit exemplary implementations of the disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

As described in the Background, some existing composite solid-state electrolytes still have insufficient effects in inhibiting lithium dendrites and improving the conductivity. Therefore, the disclosure provides an Al-doped sheet LLZO composite solid-state electrolyte and a preparation method and application thereof. The disclosure will now be further described with reference to the accompanying drawings and specific implementations.

Example 1

A preparation method of an Al-doped sheet LLZO composite solid-state electrolyte includes the following steps.

(1) 5.30915 g of lithium nitrate, 12.9903 g of lanthanum nitrate, 4.85583 g of zirconyl nitrate and 1.12539 g of aluminum nitrate were added to a mixed solution of 20 ml of deionized water and 20 ml of ethanol, and the mixture was uniformly stirred to obtain a solution A.

(2) Citric acid was added to the solution A (a molar ratio of the citric acid to total metal cations was 2:1), the mixture was uniformly stirred to obtain a solution B, ethylene glycol was added to the solution B (a molar ratio of the ethylene glycol to the citric acid was 1:1), and the mixture was uniformly stirred to obtain a solution C.

(3) 40 ml of graphene oxide solution (with a mass concentration of 2 mg/ml) was added to the solution C, and the mixture was stirred for 12 h to obtain a solution D.

(4) The above solution D was stirred on a heating stirrer at 100° C. to evaporate the solvent to obtain precursor powder, and the obtained precursor powder was placed in a muffle furnace and kept at a temperature of 700° C. for 5 h to obtain aluminum-doped sheet LLZO.

(5) A polymer substrate (PEO) and a lithium salt (LiTFSI) were added to a tetrahydrofuran solution according to a molar ratio EO:Li=8:1, and the mixture was uniformly stirred in a glove box. Then, 0.22 g of the above prepared aluminum-doped sheet LLZO was added to the mixed solution containing 2 g of the PEO and the LiTFSI, the mixture was stirred to obtain a uniformly dispersed liquid, the liquid was poured into a polytetrafluoroethylene mold, and after the solvent was volatilized, the obtained membrane was placed in a vacuum drying oven and kept at a temperature of 50° C. for 12 h. The oven-dried membrane was placed back into the glove box and air-dried for 12 h to obtain the aluminum-doped sheet LLZO composite solid-state electrolyte membrane.

Example 2

A preparation method of an Al-doped sheet LLZO composite solid-state electrolyte includes the following steps.

(1) 5.98461 g of lithium nitrate, 13.49184 g of lanthanum nitrate, 4.50073 g of zirconyl nitrate and 1.17986 g of aluminum nitrate were added to a mixed solution of 30 ml of deionized water and 30 ml of ethanol, and the mixture was uniformly stirred to obtain a solution A.

(2) Citric acid was added to the solution A (a molar ratio of the citric acid to total metal cations was 3:1), the mixture was uniformly stirred to obtain a solution B, ethylene glycol was added to the solution B (a molar ratio of the ethylene glycol to the citric acid was 2:1), and the mixture was uniformly stirred to obtain a solution C.

(3) 40 ml of graphene oxide solution (with a mass concentration of 2 mg/ml) was added to the solution C, and the mixture was stirred for 14 h to obtain a solution D.

(4) The above solution D was stirred on a heating stirrer at 100° C. to evaporate the solvent to obtain precursor powder, and the obtained precursor powder was placed in a muffle furnace and kept at a temperature of 800° C. for 2 h to obtain aluminum-doped sheet LLZO.

(5) A polymer substrate (PEO) and a lithium salt (LiTFSI) were added to a DMF solution according to a molar ratio EO:Li=10:1, and the mixture was uniformly stirred in a glove box. Then, 0.3 g of the above prepared aluminum-doped sheet LLZO was added to the mixed solution containing 3 g of the PEO and the LiTFSI, the mixture was stirred to obtain a uniformly dispersed liquid, the liquid was poured into a polytetrafluoroethylene mold, and after the solvent was volatilized, the obtained membrane was placed in a vacuum drying oven and kept at a temperature of 50° C. for 12 h. The oven-dried membrane was placed back into the glove box and air-dried for 12 h to obtain the aluminum-doped sheet LLZO composite solid-state electrolyte membrane.

Example 3

A preparation method of an Al-doped sheet LLZO composite solid-state electrolyte includes the following steps.

(1) 4.5011 g of lithium nitrate, 10.99362 g of lanthanum nitrate, 6.00892 g of zirconium acetylacetonate and 1.00365 g of aluminum nitrate were added to a mixed solution of 25 ml of deionized water and 25 ml of ethanol, and the mixture was uniformly stirred to obtain a solution A.

(2) Citric acid was added to the solution A (a molar ratio of the citric acid to total metal cations was 1:1), the mixture was uniformly stirred to obtain a solution B, ethylene glycol was added to the solution B (a molar ratio of the ethylene glycol to the citric acid was 1.5:1), and the mixture was uniformly stirred to obtain a solution C.

(3) 40 ml of graphene oxide solution (with a mass concentration of 2 mg/ml) was added to the solution C, and the mixture was stirred for 8 h to obtain a solution D.

(4) The above solution D was stirred on a heating stirrer at 100° C. to evaporate the solvent to obtain precursor powder, and the obtained precursor powder was placed in a muffle furnace and kept at a temperature of 600° C. for 8 h to obtain aluminum-doped sheet LLZO.

(5) A polymer substrate (polyvinylidene fluoride) and a lithium salt (LiTFSI) were added to an acetonitrile solution according to a molar ratio PVDF:Li=6:1, and the mixture was uniformly stirred in a glove box. Then, 0.35 g of the above prepared aluminum-doped sheet LLZO was added to the mixed solution containing 2 g of the PVDF and the LiTFSI, the mixture was stirred to obtain a uniformly dispersed liquid, the liquid was poured into a polytetrafluoroethylene mold, and after the solvent was volatilized, the obtained membrane was placed in a vacuum drying oven and kept at a temperature of 70° C. for 10 h. The oven-dried membrane was placed back into the glove box and air-dried for 12 h to obtain the aluminum-doped sheet LLZO composite solid-state electrolyte membrane.

Comparative Example 1

A preparation method of an Al-doped granular LLZO composite solid-state electrolyte includes the following steps.

(1) 4.5011 g of lithium nitrate, 10.99362 g of lanthanum nitrate, 6.00892 g of zirconium acetylacetonate and 1.00365 g of aluminum nitrate were added to a mixed solution of 25 ml of deionized water and 25 ml of ethanol, and the mixture was uniformly stirred to obtain a solution A.

(2) Citric acid was added to the solution A (a molar ratio of the citric acid to total metal cations was 1:1), the mixture was uniformly stirred to obtain a solution B, ethylene glycol was added to the solution B (a molar ratio of the ethylene glycol to the citric acid was 1.5:1), and the mixture was uniformly stirred to obtain a solution C.

(3) The above solution C was stirred on a heating stirrer at 100° C. to evaporate the solvent to obtain precursor powder, and the obtained precursor powder was placed in a muffle furnace and kept at a temperature of 600° C. for 8 h to obtain aluminum-doped sheet LLZO.

(4) A polymer substrate (polyvinylidene fluoride) and a lithium salt (LiTFSI) were added to an acetonitrile solution according to a molar ratio PVDF:Li=6:1, and the mixture was uniformly stirred in a glove box. Then, 0.35 g of the above prepared aluminum-doped sheet LLZO was added to the mixed solution containing 2 g of the PVDF and the LiTFSI, the mixture was stirred to obtain a uniformly dispersed liquid, the liquid was poured into a polytetrafluoroethylene mold, and after the solvent was volatilized, the obtained membrane was placed in a vacuum drying oven and kept at a temperature of 70° C. for 10 h. The oven-dried membrane was placed back into the glove box and air-dried for 12 h to obtain the Al-doped granular LLZO composite solid-state electrolyte membrane.

Figure 2:
FIG. 2 is an SEM image of Al-doped sheet LLZO prepared in Example 1 of the disclosure.
Figure 3:
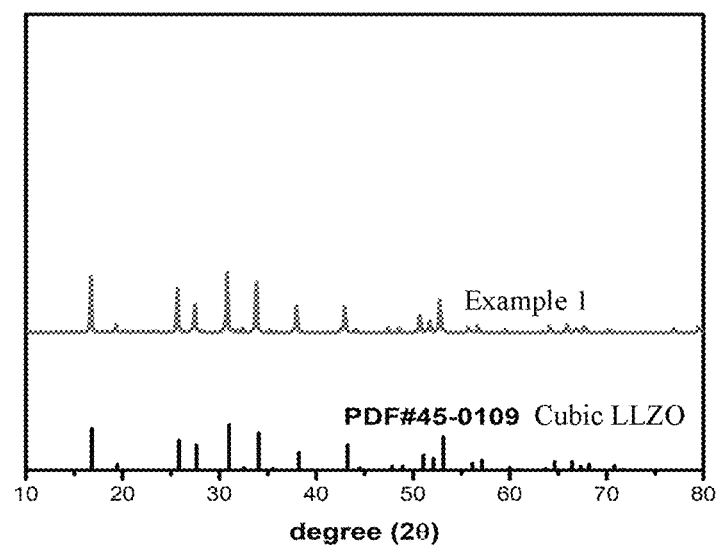
FIG. 3 is an XRD pattern of the Al-doped sheet LLZO prepared in Example 1 of the disclosure.
Figure 4:
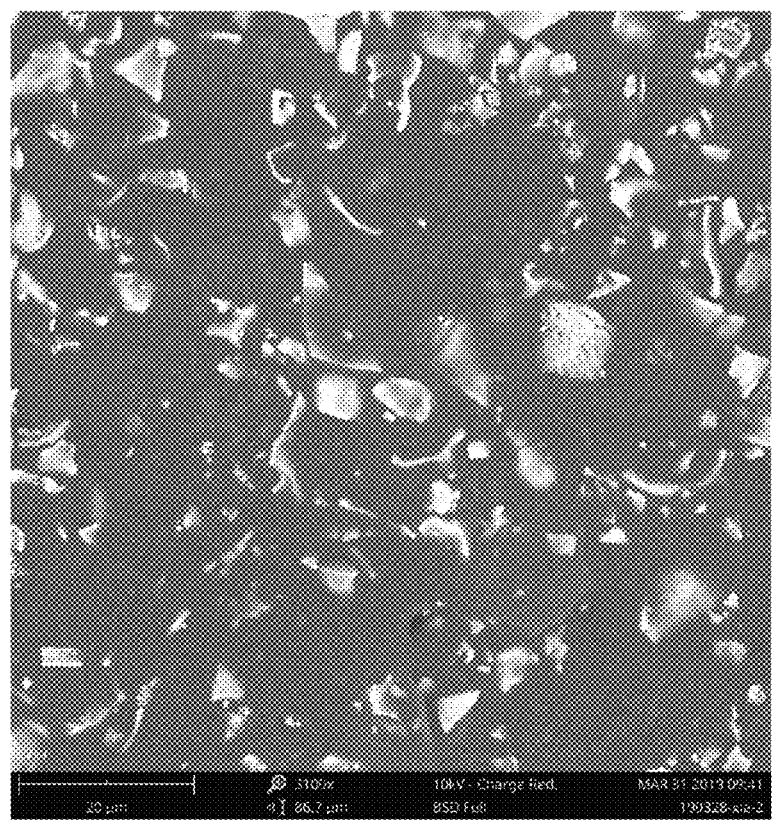
FIG. 4 is an SEM image of the Al-doped sheet LLZO composite solid-state electrolyte prepared in Example 1 of the disclosure.
Figure 5:
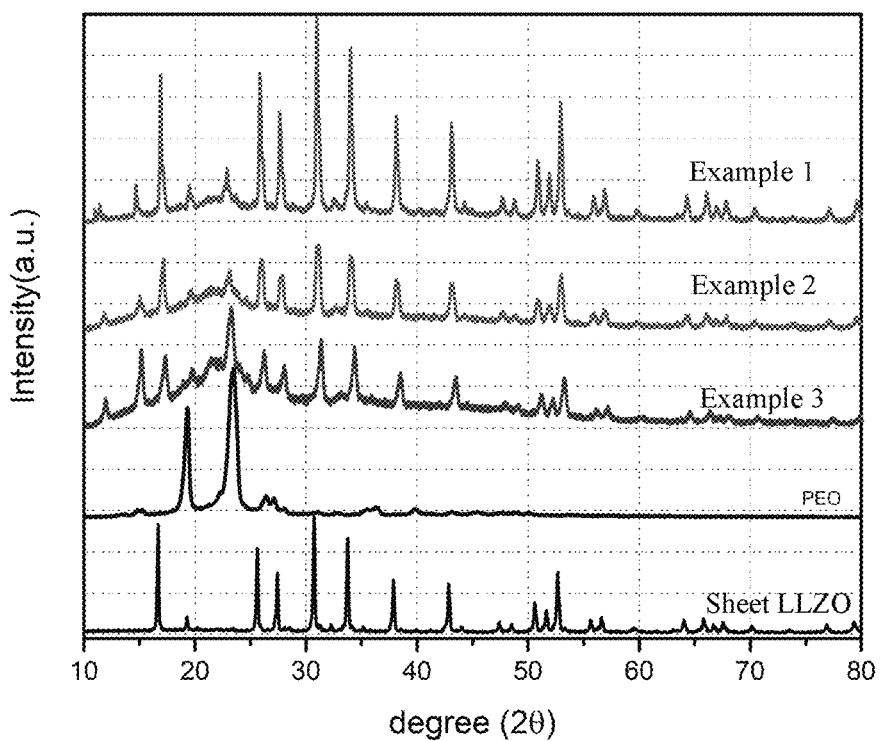
FIG. 5 is an XRD pattern of the Al-doped sheet LLZO composite solid-state electrolyte prepared in Example 1-3 of the disclosure.
Figure 6:
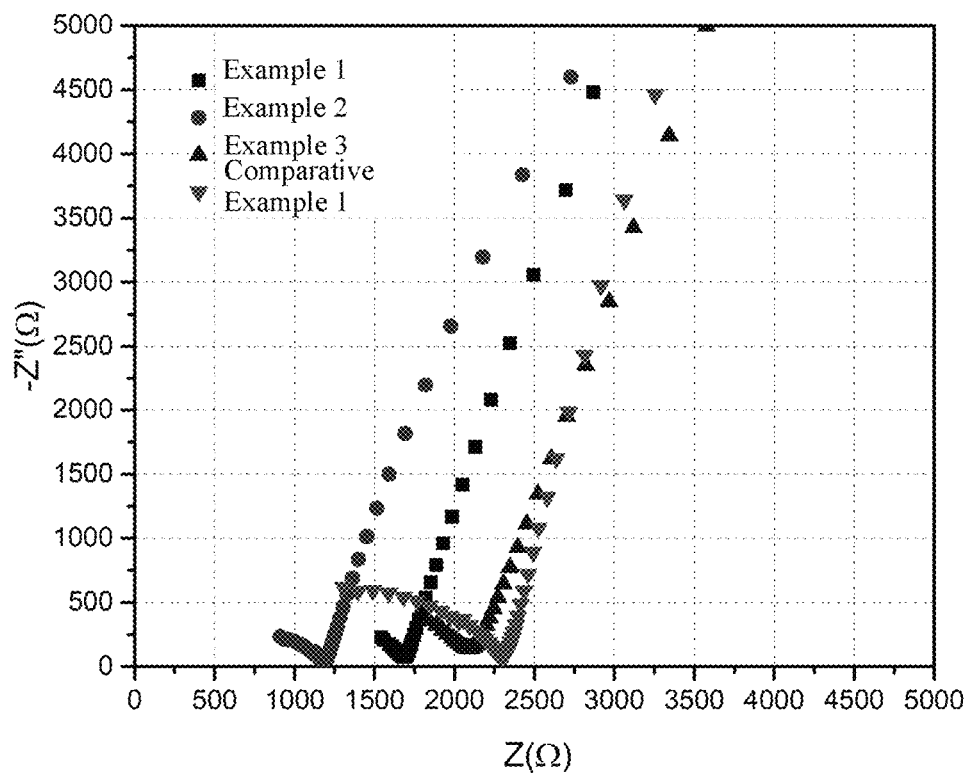
FIG. 6 is an electrochemical impedance spectrum of the Al-doped sheet LLZO composite solid-state electrolytes prepared in Examples 1-3 of the disclosure.

Performance Tests:

(1) FIG. 1 is a schematic structural diagram of the Al-doped sheet LLZO composite solid-state electrolyte prepared in Example 1. The Al-doped sheet LLZO solid-state electrolyte is dispersed in the polymer substrate PEO. This structure can also be confirmed from the SEM image of FIG. 2, and the sheet LLZO solid-state electrolyte can be clearly seen in FIG. 2. FIG. 3 is an XRD pattern of the aluminum-doped sheet LLZO solid-state electrolyte prepared in Example 1, indicating that the prepared sample is cubic form LLZO. FIG. 4 is an SEM image of the Al-doped sheet LLZO composite solid-state electrolyte prepared in Example 1. It can be seen from the figure that the sheet LLZO has been doped into PEO. FIG. 5 is an XRD pattern of the Al-doped sheet LLZO composite solid-state electrolytes prepared in Examples 1-3, indicating that the sheet LLZO has been doped into the PEO and effectively reduced the crystallinity of PEO. FIG. 6 is an electrochemical impedance spectrum of the Al-doped sheet LLZO composite solid-state electrolytes prepared in Examples 1-3 and the granular LLZO composite solid-state electrolyte prepared in Comparative Example 1. It can be seen from the figure that the composite solid-state electrolyte doped with sheet LLZO has higher conductivity than the composite solid-state electrolyte doped with granular LLZO.

Figure 7:
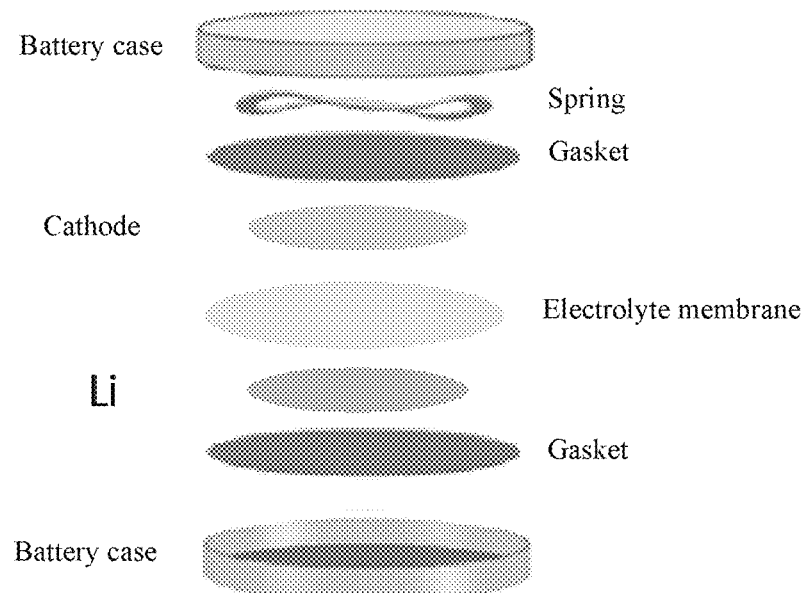
FIG. 7 is a schematic structural diagram of an all-solid-state battery of Example 4 of the disclosure.
Figure 8:
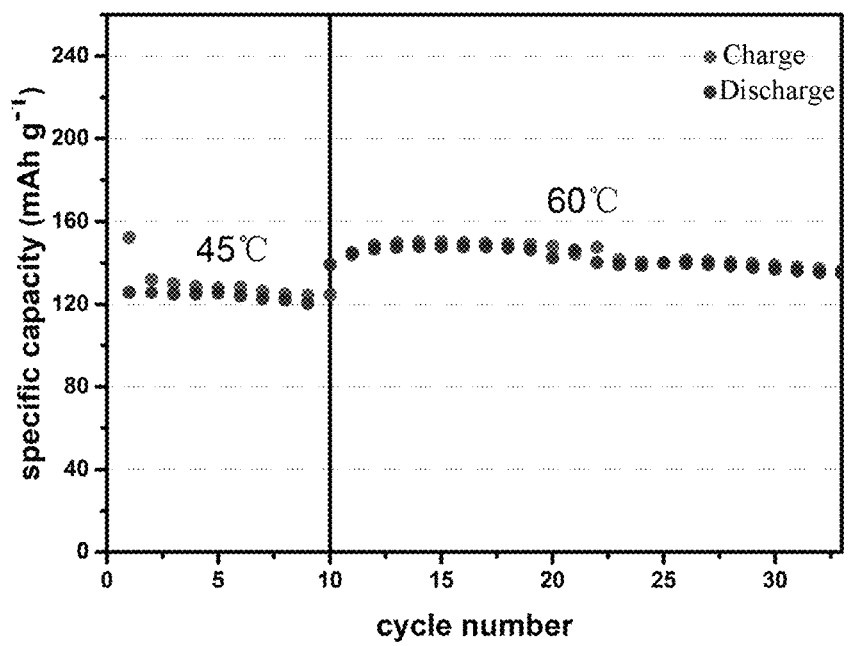
FIG. 8 is a cycle-specific capacity diagram of the all-solid-state battery assembled in Example 4 of the disclosure.
Figure 9:
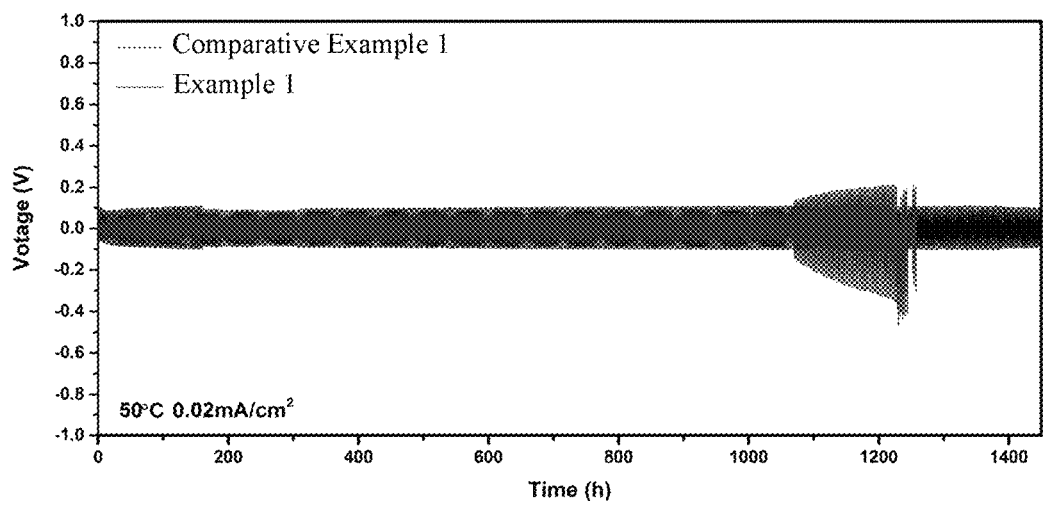
FIG. 9 is a time-voltage diagram of a symmetrical battery assembled using the composite solid-state electrolyte prepared in Example 1 of the disclosure.

(2) An all-solid-state battery was assembled using the Al-doped sheet LLZO composite solid-state electrolyte (that is, the electrolyte membrane) prepared in Example 1 according to FIG. 7 and tested for its performance. FIG. 8 shows a cycle diagram of the all-solid-state battery. It can be seen from the figure that the all-solid-state battery has high cycle stability and high specific capacity at both 60° C. and 45° C. FIG. 9 is a time-voltage diagram of the solid-state battery and a symmetrical battery assembled using the granular LLZO doped composite solid-state electrolyte prepared in Comparative Example 1. It can be seen from the figure that the sheet LLZO doped composite solid-state electrolyte has better lithium stability and effects in inhibiting growth of lithium dendrites than the granular LLZO doped composite solid-state electrolyte.

The foregoing descriptions are merely exemplary embodiments of the disclosure, but are not intended to limit the disclosure. A person skilled in the art may make various alterations and variations to the disclosure. Any modification, equivalent replacement, or improvement made within the spirit and principle of the disclosure shall fall within the protection scope of the disclosure.

What is claimed is:

1. An Al-doped sheet LLZO composite solid-state electrolyte, comprising Al ions, an LLZO solid-state electrolyte and a polymer substrate, wherein the Al ions are in the LLZO solid-state electrolyte in a sheet structure, and the LLZO solid-state electrolyte is dispersed in the polymer substrate;

wherein the Al-doped sheet LLZO composite solid-state electrolyte is prepared by a method comprising the following steps:

(1) adding metal cations $Li^+$, $La^{3+}$, $Zr^{4+}$ and $Al^{3+}$ to a mixed solution of ethanol and deionized water to obtain a mixed solution A;

(2) adding citric acid to the mixed solution A in step (1) to obtain a first mixture, uniformly stirring the first mixture, then adding ethylene glycol to the first mixture to obtain a second mixture, uniformly stirring the second mixture, adding graphene oxide to the second mixture, and stirring the second mixture to obtain a mixed solution B;

(3) placing the mixed solution B in step (2) on a heating stirrer, and heating and stirring the mixed solution B until liquid is completely evaporated, thereby obtaining sheet LLZO precursor powder;

(4) calcining the sheet LLZO precursor powder in step (3) to obtain Al-doped sheet LLZO for later use;

(5) dissolving a polymer electrolyte and a lithium salt in an organic solvent in a protective atmosphere, and then adding the Al-doped sheet LLZO in step (4) to obtain a mixed solution C; and (6) after the organic solvent in the mixed solution C in step (5) is volatilized, oven-drying an obtained product, and then air-drying the obtained product in a protective atmosphere to obtain the Al-doped sheet LLZO composite solid-state electrolyte;

wherein, in step (2), a molar ratio of the citric acid to a total of the metal cations is (1-3):1, a molar ratio of the ethylene glycol to the citric acid is 1:(1-2), and a stirring time after adding the graphene oxide is 8-14 h; and in step (4), the calcination is carried out by keeping a temperature at 700-800° C. for 2-8 h.

2. The Al-doped sheet LLZO composite solid-state electrolyte according to claim 1, wherein the polymer substrate comprises: any one of polyvinylidene fluoride and PEO.

3. The Al-doped sheet LLZO composite solid-state electrolyte according to claim 1, wherein a content of the LLZO solid-state electrolyte accounts for 10-50% of total mass of the Al-doped sheet LLZO composite solid-state electrolyte.

4. The Al-doped sheet LLZO composite solid-state electrolyte according to claim 1, wherein in step (1), the $Li^+$, $La^{3+}$, $Zr^{4+}$ and $Al^{3+}$ are respectively water-soluble inorganic salts of the corresponding metal cations.

5. The Al-doped sheet LLZO*composite solid-state electrolyte according to claim 1, wherein:

in step (5), the polymer electrolyte comprises: any one of polyvinylidene fluoride and PEO;

the lithium salt comprises: LiTFSI or $LiClO_4$;

a molar ratio of the polymer electrolyte to lithium in the lithium salt is 6-10:1;

the organic solvent comprises any one of tetrahydrofuran, acetonitrile and DMF; and in step (6), the oven-drying is carried out at a temperature of 50-70° C. for 10-12 h;

wherein the protective atmosphere in step (5) and step (6) is argon.

6. An all-solid-state battery, comprising an anode, an electrolyte membrane, a cathode, a gasket, a spring and a battery case; wherein the gasket, the anode, the electrolyte membrane, the cathode, the gasket and the spring are sequentially laminated to form a laminated structure, the laminated structure is encapsulated inside the battery case, and the electrolyte membrane is the Al-doped sheet LLZO composite solid-state electrolyte according to claim 1.

* * * * *